W. A. SCHOENHAAR.
HEAT DISTRIBUTING DEVICE FOR GAS RANGES.
APPLICATION FILED JUNE 14, 1912.

1,048,355.

Patented Dec. 24, 1912.

2 SHEETS—SHEET 1.

WITNESSES

INVENTOR
William A. Schoenhaar
by
Attorneys

W. A. SCHOENHAAR.
HEAT DISTRIBUTING DEVICE FOR GAS RANGES.
APPLICATION FILED JUNE 14, 1912.

1,048,355.

Patented Dec. 24, 1912.

2 SHEETS—SHEET 2.

WITNESSES

INVENTOR
William A. Schoenhaar
By
Attorneys

UNITED STATES PATENT OFFICE.

WILLIAM A. SCHOENHAAR, OF WILMINGTON, DELAWARE.

HEAT-DISTRIBUTING DEVICE FOR GAS-RANGES.

1,048,355.     Specification of Letters Patent.     Patented Dec. 24, 1912.

Application filed June 14, 1912. Serial No. 703,656.

*To all whom it may concern:*

Be it known that I, WILLIAM A. SCHOENHAAR, of Wilmington, in the county of Newcastle and State of Delaware, have invented certain new and useful Improvements in Heat-Distributing Devices for Gas-Ranges; and I hereby declare that the following is a full, clear, and exact description thereof, reference being had to the accompanying drawings, which form part of this specification.

This invention is a novel heat distributing or controlling device especially designed for use with oil or gas ranges, and the object of the invention is to enable the heat from the burner to be easily controlled, so that the heat will be conserved and supplied more equally to the object being heated or cooked; thus preventing the burning of utensils, or of food being cooked, by unequal distribution of the heat applied thereto; or which might result from direct application of the hot gases from the burner.

I will describe the invention with reference to the accompanying drawings which illustrate a heat distributing device or attachment embodying the invention, and in the claims I have set forth the novel features and combinations of elements for which I desire protection.

Figure 1:
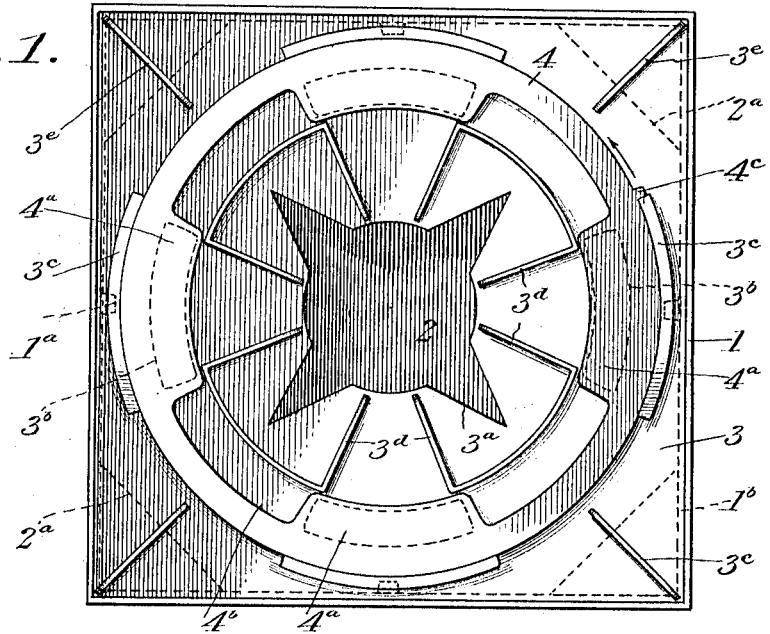
Figure 2:
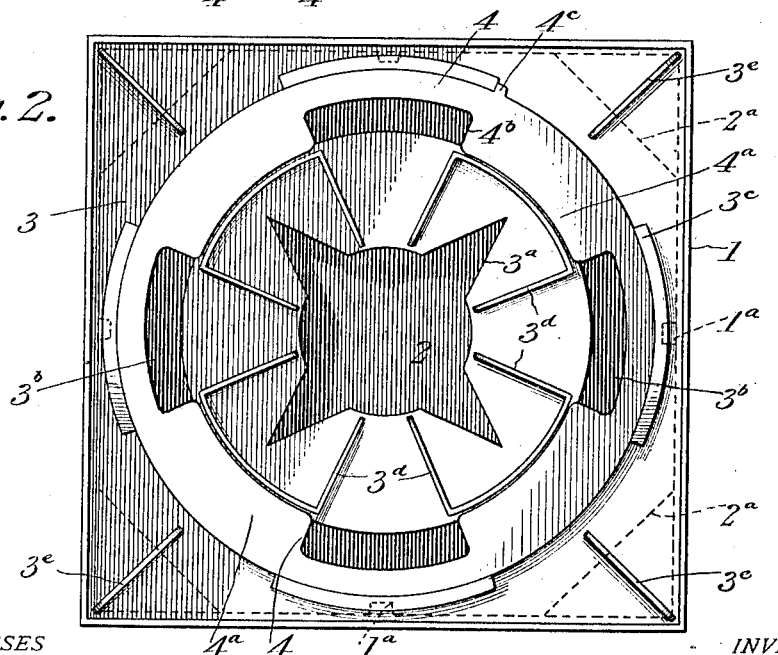
Figure 3:
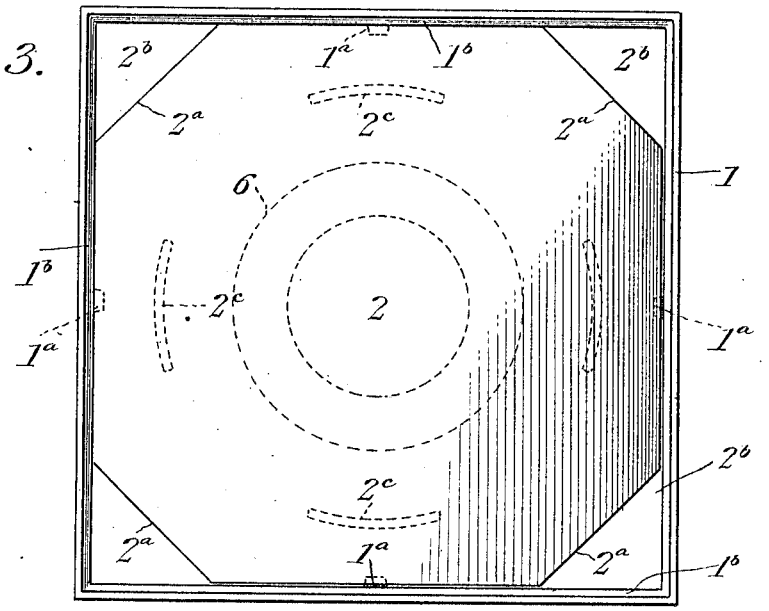
Figure 4:
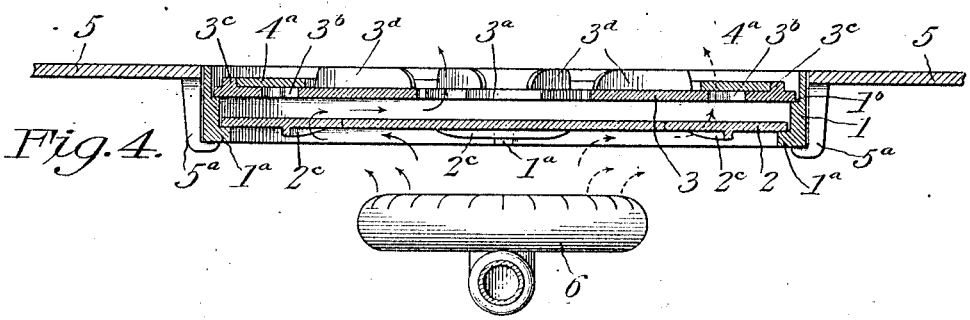
Figure 5:
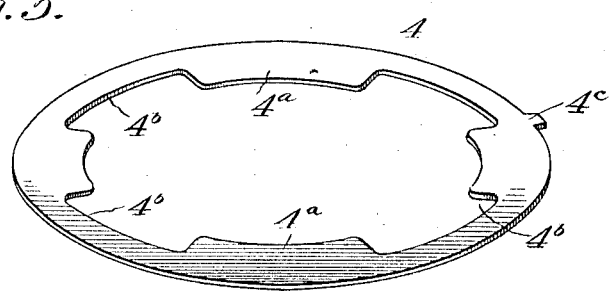

In said drawings—Figure 1 is a top plan view of the complete heat distributing and regulating device with the valve ring adjusted to direct all the heat to the center thereof. Fig. 2 is a similar view with the damper adjusted to distribute the heat. Fig. 3 is a view of the device with the valve ring removed. Fig. 4 is a transverse vertical section through the device in position above the burner. Fig. 5 is a view of the valve ring detached.

The device comprises preferably a frame 1 which may be of any desired contour but is shown as rectangular. Said frame is provided with internal lugs 1ª upon which rests a removable baffle plate 2 which when the device is in operative position will come directly over the burner of the stove, see Fig. 4. This baffle plate 2 may have its corners cut, as indicated at 2ª, forming openings 2ᵇ, through which openings the hot gases from the burner pass above the baffle plate 2; and said plate is preferably provided on its under side with depending deflecting ribs or flanges 2ᶜ which tend to direct the hot gases toward the openings 2ᵇ.

The frame 1 is provided above the baffle plate 2 with shoulders 1ᵇ upon which is supported a regulating or damper plate 3, having a central passage or opening 3ª and around this central passage an annular series of openings 3ᵇ. Upon the upper face of the plate 3 and adjacent the openings are upwardly projecting ribs 3ᵈ, which serve as utensil supporting devices and the spaces between the ribs serve as passages for the hot gases. At the corners of the plate 3 are upstanding ribs 3ᵉ.

Exterior to the openings 3ᵇ and on the upper side of the plate are curved ribs 3ᶜ which serve to guide, and prevent lateral displacement of, a rotatorially adjustable valve ring 4 which is provided with inwardly projecting widened valve portions 4ª (separated by recesses 4ᵇ) which when the ring is adjusted to the position shown in Fig. 1 will cover the openings 3ᵇ in plate 3; and when the ring is in the position indicated in Fig. 2 the openings 3ᵇ will be uncovered. The valve ring is also provided on its periphery with a lug 4ᶜ which is adapted to engage the ends of adjacent ribs 3ᶜ to limit the rotary adjustment of the ring. Of course this valve ring may be adjusted to any desired position intermediate the positions indicated in Figs. 1 and 2.

The novel device is adapted to be placed over an ordinary gas or oil or vapor burner, indicated at 6 in Figs. 3 and 4. In Fig. 4, 5 represents the top of an ordinary gas range provided with depending lugs 5ª upon which the frame 1 is supported. The frame 1 may be made of any desired shape to suit any standard make of stove; so that it can be placed on an ordinary stove over the burner; and when the device is used the grating customarily placed over the burner should be removed.

When all the parts of the device are in position as indicated in Figs. 2 and 4, the hot gases will pass from the burner beneath baffle plate 2 and through the openings 2ᵇ to and beneath the plate 3 and will pass out through the central opening 3ª in plate 3 if the valve ring 4 be closed as in Figs. 1 and 4; or will pass through both the central opening and the openings 3ᵇ if the valve ring 4 be adjusted as indicated in Fig. 2.

In Fig. 4 the arrows in full lines indicate the course of the hot gases from the burner to the central opening 3ª when the outer passages 3ᵇ are closed, as in Fig. 1; while the arrows shown in dotted lines in Fig. 4 indicate the direction taken by the hot gases when the passages 3ᵇ are open, as indicated in Fig. 2.

With this device a vessel can be supported above the burner and the hot gases can be distributed practically uniformly beneath the bottom of such vessel if it is large, or concentrated under the center thereof if it is small. When used for broiling the valve ring should be adjusted until the desired equal distribution of hot gases is obtained. The ribs 3ᵉ serve to support utensils above the surface of the plate 3, and allow the gases to be distributed uniformly under said utensil.

If it is desired to heat sad irons without direct contact with the hot gases the plate 3 with ring 4 can be removed from the frame, see Fig. 3, and the irons can then be set directly upon the plate 2.

What I claim is:

1. An attachment for gas ranges comprising a frame; a baffle plate therein; a damper plate above and spaced from the baffle plate having an annular series of openings for the passage of gases, and upstanding flanges on its upper face, and an annular valve having radially projecting portions adapted to close the openings, substantially as described.

2. In combination, a frame; a baffle plate in said frame adapted to direct the hot gases outwardly from the burner, a damper plate in the frame above and spaced from the baffle plate provided with a central opening and an annular series of openings around the central opening, and a valve for regulating the openings in said damper plate.

3. In combination, a frame, a baffle plate in said frame so shaped as to leave openings for the passage of hot gases near its outer edge; a damper plate in the frame, above and spaced from the baffle plate, provided with an annular series of openings and upstanding ribs on its upper side; and a ring valve upon said damper plate adapted to regulate the passage of gases through said openings.

4. An attachment for gas ranges, comprising a frame, a baffle plate removably supported in said frame; a damper plate in the frame above and spaced from the baffle plate having a central opening and an annular series of openings around the central opening for the passage of gases, and a ring valve on said plate having inwardly projecting portions adapted to close the openings when the valve is adjusted in proper position, substantially as described.

5. An attachment for gas ranges, comprising a frame, a baffle plate in said frame having depending flanges to divert the hot gases; a damper plate in the frame above and spaced from the baffle plate and having an annular series of openings for the passage of gases and upstanding flanges on its upper face, and a ring valve guided by said flanges and adapted to close the openings in the damper plate when the valve is adjusted in proper position, substantially as described.

6. An attachment for gas ranges, comprising a frame provided with lugs, a baffle plate in said frame cut away at its corners and having depending flanges to divert the hot gases; a damper plate removably supported in the frame above and spaced from the baffle plate and having a central opening and an annular series of openings around the central opening for the passage of gases, and upstanding flanges intermediate the openings on its upper face, and a ring valve on said damper plate having inwardly projecting portions adapted to close the openings in said damper plate when the valve is adjusted in proper position, substantially as described.

In testimony that I claim the foregoing as my own, I affix my signature in presence of two witnesses.

WILLIAM A. SCHOENHAAR.

Witnesses:
JOHN B. KINEGER,
SADIE GLUCKMAN.

Copies of this patent may be obtained for five cents each, by addressing the "Commissioner of Patents, Washington, D. C."